(12) United States Patent
Park

(10) Patent No.: US 11,242,668 B2
(45) Date of Patent: Feb. 8, 2022

(54) QUICK JOINT OF FRONT LOADER

(71) Applicant: DAEDONG MOBILITY CORP., Anseong-si (KR)

(72) Inventor: Jin Mok Park, Gyeongsangnam-do (KR)

(73) Assignee: DAEDONG MOBILITY CORP., Anseong-si (KR)

( * ) Notice: Subject to any disclaimer, the term of this patent is extended or adjusted under 35 U.S.C. 154(b) by 450 days.

(21) Appl. No.: 16/509,510

(22) Filed: Jul. 12, 2019

(65) Prior Publication Data

US 2021/0010224 A1 Jan. 14, 2021

(51) Int. Cl.
*E02F 3/36* (2006.01)
*A01B 59/06* (2006.01)
*E02F 3/34* (2006.01)

(52) U.S. Cl.
CPC .......... *E02F 3/3622* (2013.01); *A01B 59/064* (2013.01); *E02F 3/3408* (2013.01)

(58) Field of Classification Search
CPC ..... E02F 3/3622; E02F 3/3408; E02F 3/3627; E02F 3/3631; E02F 3/627; F16B 45/02; A01B 59/064; A01B 59/062
See application file for complete search history.

(56) References Cited

U.S. PATENT DOCUMENTS

| | | | | |
|---|---|---|---|---|
| 4,661,036 A * | 4/1987 | Horsch | .................... | E02F 3/627 172/272 |
| 5,082,065 A * | 1/1992 | Fletcher | ............... | A01B 59/062 172/273 |
| 5,466,113 A * | 11/1995 | Norberg | ................ | A01B 59/064 37/468 |
| 5,727,342 A * | 3/1998 | Horton | ................... | E02F 3/3622 37/468 |
| 6,000,154 A * | 12/1999 | Berard | ................... | E02F 3/3622 37/468 |
| 7,001,136 B2 * | 2/2006 | Perrin | .................... | E02F 3/3636 37/468 |
| 9,091,295 B1 * | 7/2015 | Yang | ................... | A62B 35/0037 |
| 10,106,950 B2 * | 10/2018 | Martin | ................... | E02F 3/3631 |
| 2006/0245899 A1 * | 11/2006 | Lyons | .................... | E02F 3/6273 414/686 |
| 2012/0107080 A1 * | 5/2012 | Hilsden | ................... | E02F 3/627 414/723 |
| 2015/0129513 A1 * | 5/2015 | Gilmore, Jr. | ........... | B01D 35/02 210/806 |
| 2018/0327998 A1 * | 11/2018 | Torii | ...................... | B62D 49/02 |
| 2019/0323202 A1 * | 10/2019 | Nadaoka | ............... | E02F 3/6273 |

\* cited by examiner

*Primary Examiner* — Jamie L McGowan
(74) *Attorney, Agent, or Firm* — Revolution IP, PLLC

(57) ABSTRACT

A quick joint of a front loader, the quick joint includes: a coupling member (30) having a hook shape and pivotally connected to a first pivot point (P1) of a boom post (20) through a first pivot shaft (31); a spring member (32) for applying an elastic force in a direction of releasing the coupling member (30) from a coupling target shaft (14) disposed on a boom post support (10) which is attached to a tractor (1); a lock unit (34) having a part making contact with the coupling member (30), and provided with a lock pin (36) for restraining behavior of the coupling member (30) at a coupling position (A1); and a guide slot (38) having an arc shape and formed in the boom post (20) to define a moving path of the lock pin (36) when the lock unit (34) rotates.

5 Claims, 10 Drawing Sheets

QUICK JOINT OF FRONT LOADER

BACKGROUND OF THE INVENTION

1. Field of the Invention

The present invention relates to a quick joint of a front loader, and particularly, to a quick joint capable of rapidly attaching and detaching (coupling and separating) a front loader.

2. Description of the Related Art

Tractors may perform various operations by mounting working devices on the front of rear of the tractor. For example, the working devices such as a loader, a rake, a rotavator, a plow, and a harrow may be attached to the front of rear of the tractor to perform various agricultural operations such as soil transportation, tillage, soil crushing, pumping, and threshing.

Among the above operations, a front loader is mounted on the tractor to load or move the soil, aggregates, etc. The front loader includes: a boom post coupled to a boom post support of a vehicle body (tractor); a boom; an arm; a boom cylinder; a bucket cylinder; and a bucket installed at a front end portion of the arm.

A conventional front loader for a tractor may adjust the height of the boom with respect to the boom post by using the boom cylinder, and may adjust an angle of the bucket with respect to the arm by using the bucket cylinder. Therefore, various operations such as scooping or pushing the soil on the ground to move the soil to another place, or pouring out the soil may be performed.

The front loader may be detachably connected to the boom post support. Therefore, the front loader may be attached to the front of the tractor if necessary, and may be detached from the tractor after use and separately stored. Conventionally, in order to attach and detach the front loader, as shown in FIG. 1, a scheme of mounting a boom post on a boom post support 100 and fitting a pin 300 into a predetermined position to connect the front loader has been mainly adopted.

Such a scheme of connecting the front loader by using the pin 300 allows a structure to be simple, so that it is advantageous in terms of manufacture and unit cost. However, in attaching or removing the front loader to or from the tractor, the pin 300 has to be fitted and removed manually, so that a considerable amount of inconvenience is involved in attaching the front loader, and it takes a long time for a worker to replace the front loader alone.

In addition, loader operations are frequently exposed to various oxidants such as compost and soil or foreign substances such as dust due to the nature of the loader operations. Therefore, the pin 300 is easily corroded or stuck, which results in an increase in the manpower consumed during a pin separating operation for removing the front loader. In some cases, even additional equipment such as a hammer or a hydraulic jack may be necessary.

SUMMARY OF THE INVENTION

The present invention proposes an apparatus for rapidly mounting or removing a front loader on or from a tractor.

The present invention provides a quick joint of a front loader, the quick joint including: a coupling member having a hook shape and pivotally connected to a first pivot point of a boom post, which constitutes the front loader, through a first pivot shaft; a spring member for applying an elastic force in a direction of releasing the coupling member from a coupling target shaft disposed on a boom post support which is attached to a tractor; a lock unit having a part making contact with the coupling member to rotate about a fixed pin which is provided on a side surface of the boom post, and provided with a lock pin for restraining behavior of the coupling member at a coupling position; and a guide slot having an arc shape and formed in the boom post to define a moving path of the lock pin when the lock unit rotates, wherein a fixing groove is formed in the guide slot and aligned on a same line with the coupling position, and the lock pin is inserted into the fixing groove to restrain the behavior of the coupling member when the rotating lock unit reaches the coupling position.

According to an embodiment of the present invention, a fastening scheme using the hook-shaped coupling member is adopted, so that the front loader can be easily and rapidly attached to or removed from the tractor without exerting a great amount of effort as compared with the conventional pin connection scheme.

DETAILED DESCRIPTION OF THE INVENTION

Figure 1:
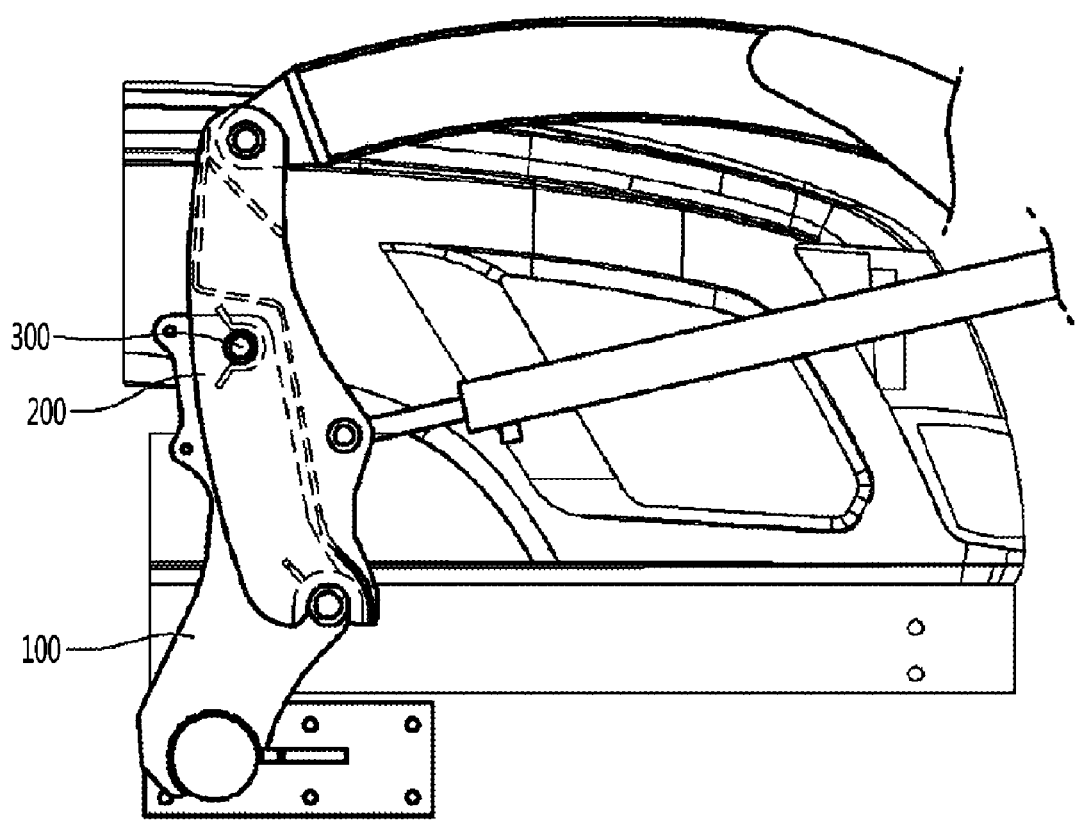
FIG. 1 is a schematic view showing a conventional front loader.
Figure 2:
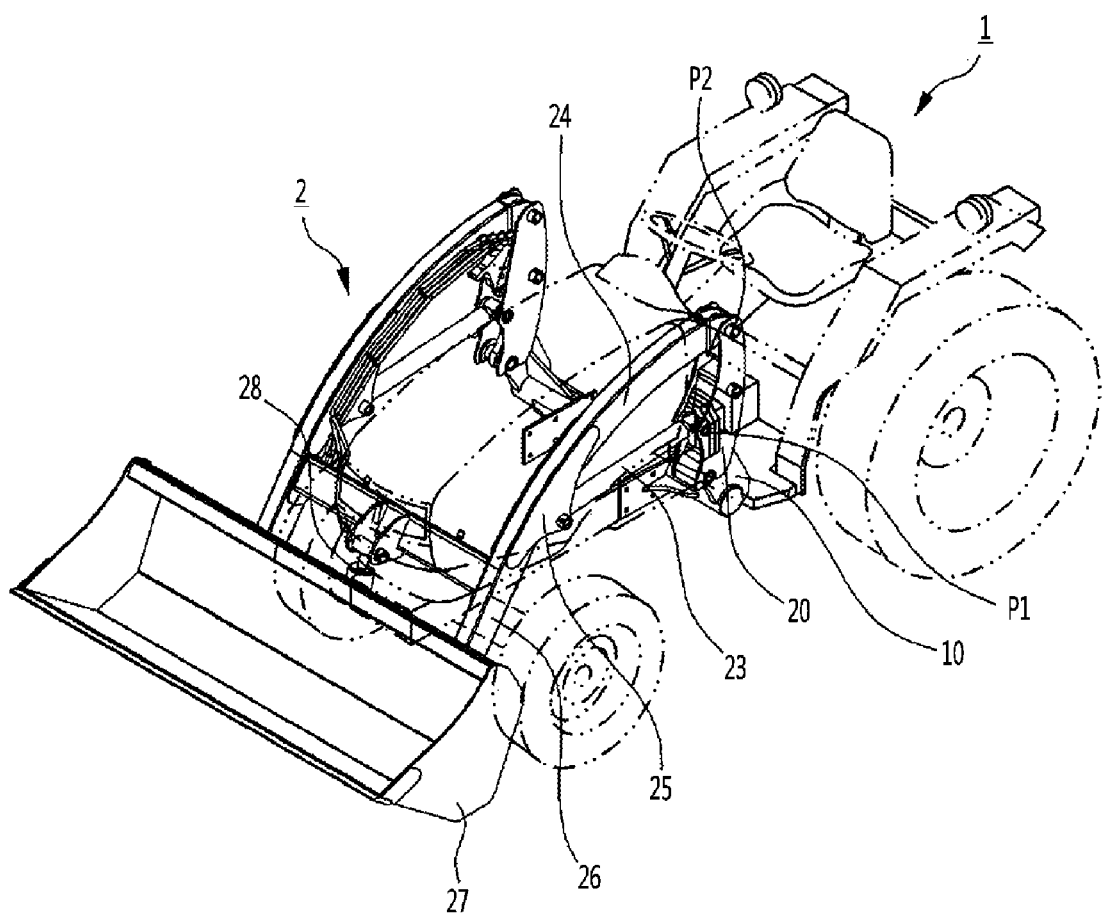
FIG. 2 is a perspective view showing a tractor provided with a front loader.
Figure 3:
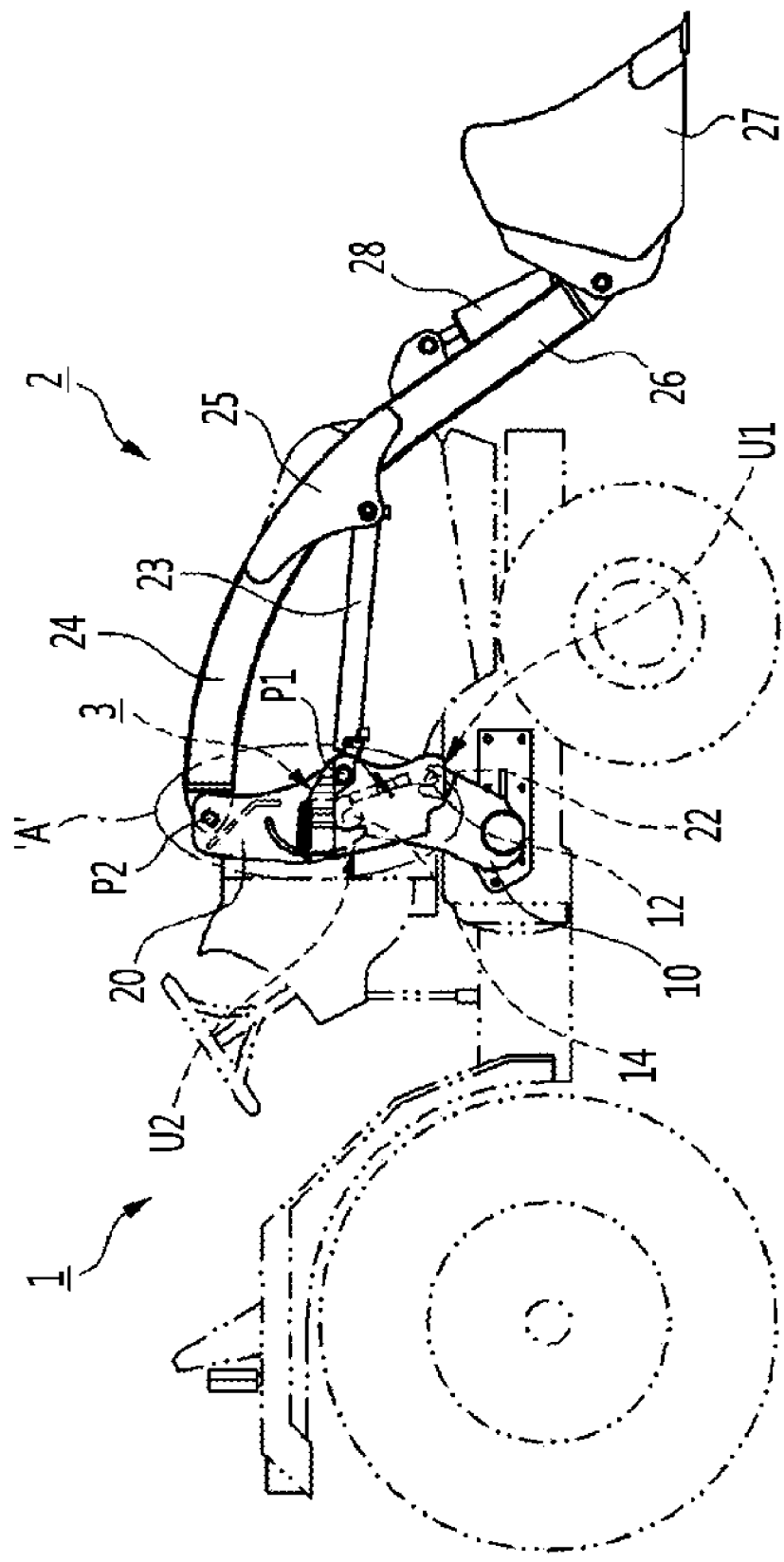
FIG. 3 is a side view showing the tractor provided with the front loader of FIG. 2.

Referring to FIGS. 2 to 3, an overall configuration of a front loader including a quick joint according to an embodiment of the present invention will be schematically described.

FIG. 2 is a perspective view showing a tractor provided with a front loader, and FIG. 3 is a side view showing the tractor provided with the front loader of FIG. 2. In addition, FIG. 4 is a side view showing a state before a boom post of the front loader is coupled to a boom post support provided on the tractor.

Figure 4:
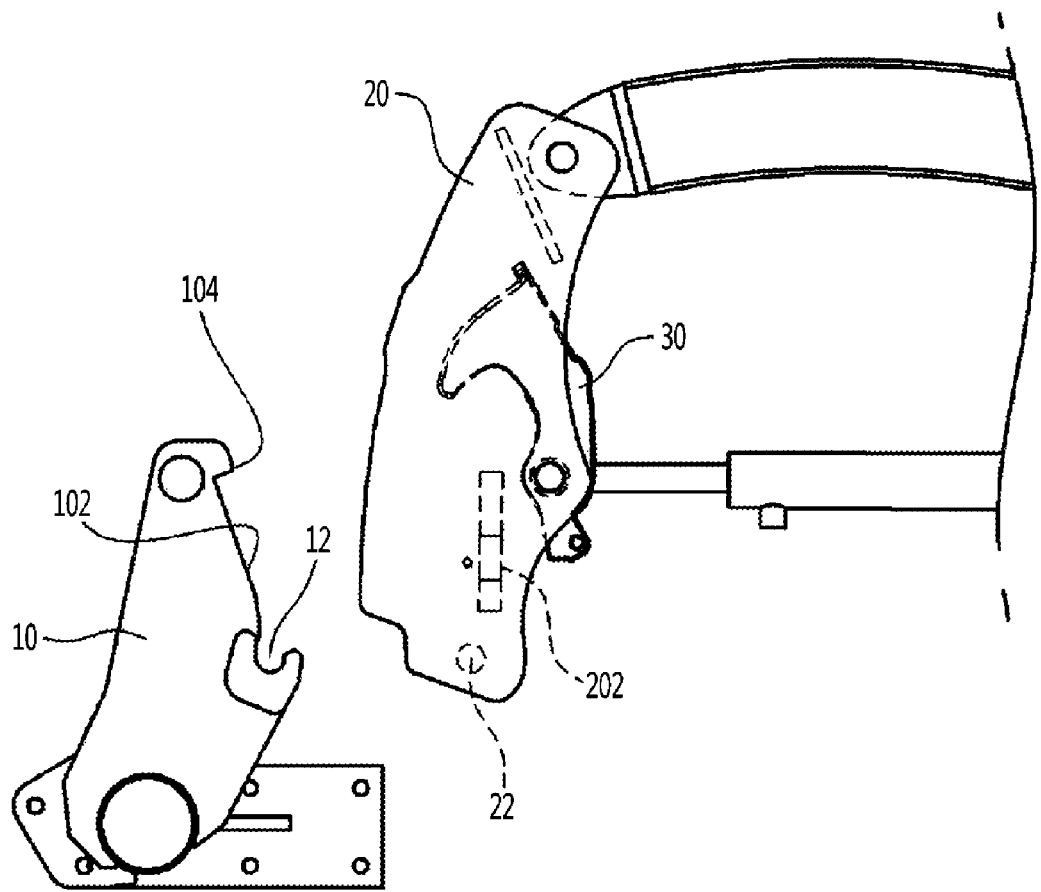
FIG. 4 is a side view showing a state before a boom post of the front loader is coupled to a boom post support provided on the tractor.

Referring to FIGS. 2 to 4, a front loader 2 is connected to a front side of a vehicle body of a tractor 1. In the front loader 2, a height of a boom 24 is adjusted by a boom cylinder 23, and an angle of a bucket 27 with respect to an arm 26 is adjusted by a bucket cylinder 28. With the above configuration, various operations such as scooping or pushing the soil on the ground to move the soil to another place or pouring out the soil may be performed.

The front loader 2 includes a boom post 20 for connecting the front loader 2 to the tractor 1. In addition, a boom post support 10 is provided on both sides of the vehicle body of the tractor 1, and the boom post 20 is coupled to the boom post support 10, so that the front loader 2 may be fixedly coupled to the tractor 1. The boom post support 10 has a seating groove 12 and a coupling target shaft 14, and the boom post 20 is provided with a seating pin 22 and a quick joint 3 corresponding to the seating groove 12 and the coupling target shaft 14, respectively.

A first coupling point U1 at which the seating pin 22 is coupled to the seating groove 12 and a second coupling point U2 at which the quick joint 3 is coupled to the coupling target shaft 14 are formed. The boom post 20 and the boom post support 10 may be connected to each other so as to be tightly coupled to each other.

Two pivot points P1 and P2 are formed in the boom post 20. One end of the boom cylinder 23 is pivotally connected to a pivot point P1 (hereinafter, referred to as a "first pivot point") that is located relatively lower than the other between the two pivot points P1 and P2. In addition, one end of the boom 24 is pivotally connected to a pivot point P2 (hereinafter, referred to as "second pivot point") that is located relatively higher than the first pivot point P1.

The arm 26 is connected to an opposite end of the boom 24 through a cam plate 25. In addition, the bucket 27 is pivotally connected to a front end portion of the arm 26. An opposite end of the boom cylinder 23 is pivotally connected to the cam plate 25. One end of the bucket cylinder 28 is connected to a bracket (reference numeral omitted) which is coupled to the arm 26 while being spaced apart from a pivot point at which the bucket 27 is connected to the arm 26, and an opposite end of the bucket cylinder 28 is connected to the bucket 27.

The boom cylinder 23 adjusts a pivot (rotation angle) between the boom 24 and the arm 26 about the second pivot point P2, and the bucket cylinder 28 adjusts a bending angle of the bucket 27 with respect to the arm 26. Accordingly, the pivot between the boom 24 and the arm 26 is adjusted through the boom cylinder 23, and the angle of the bucket 27 with respect to the arm 26 is adjusted through the bucket cylinder 28, so that various operations may be implemented.

Figure 5:
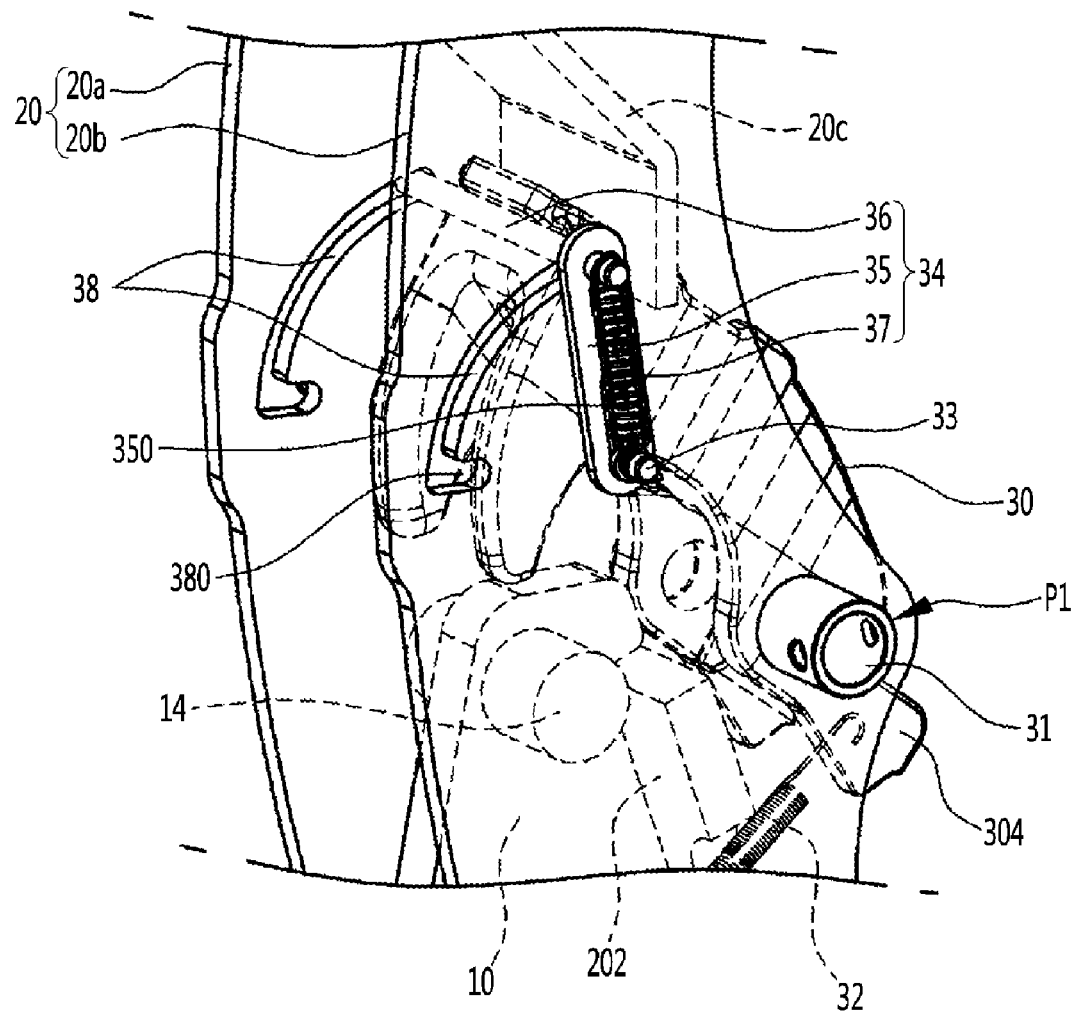
FIG. 5 is an enlarged detailed view of an 'A' portion of FIG. 3.
Figure 6:
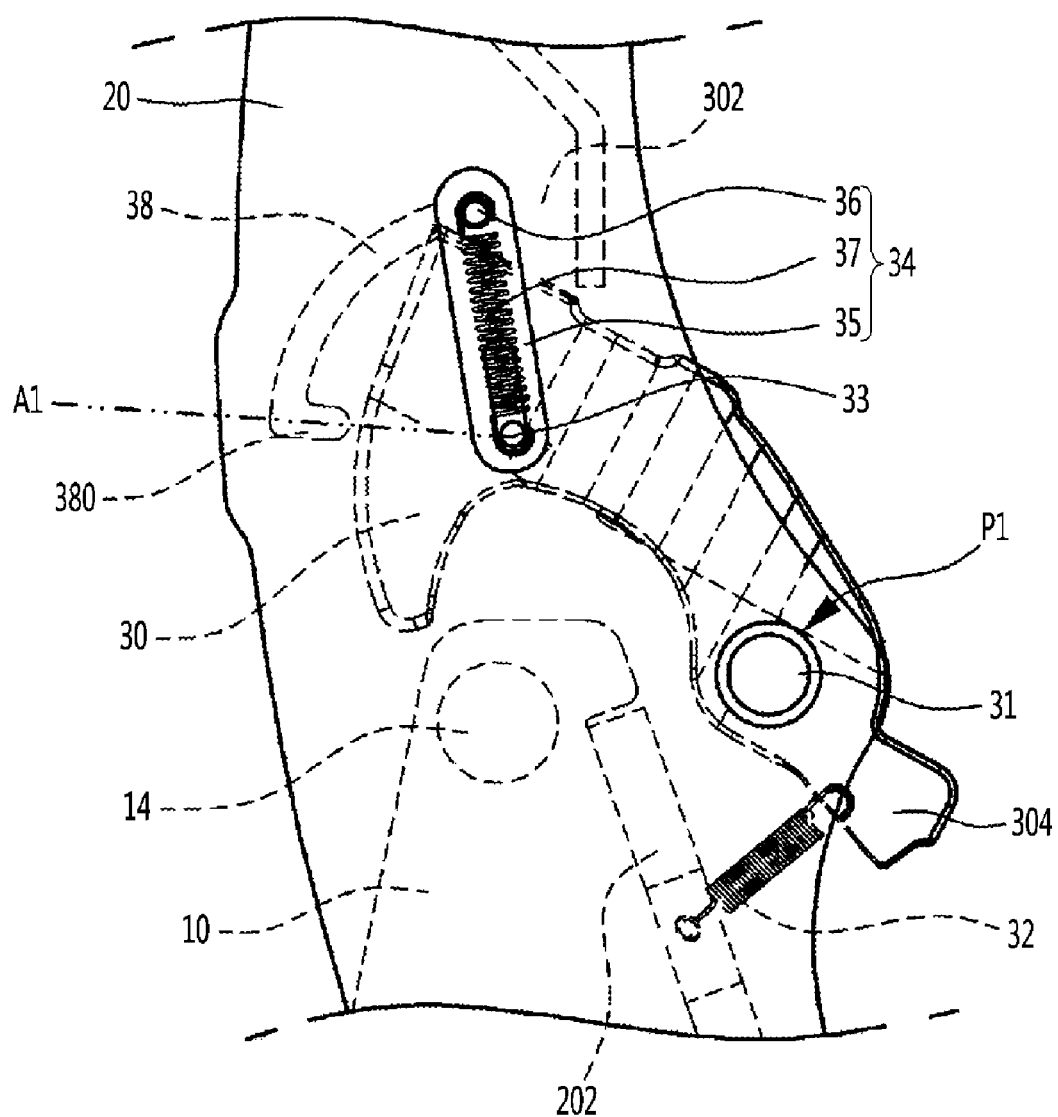
FIG. 6 is a side view showing the boom post of FIG. 5.

FIG. 5 is an enlarged detailed view of an 'A' portion of FIG. 3, which is a perspective view showing the boom post including a quick joint of the front loader according to the embodiment of the present invention, and FIG. 6 is a side view showing the boom post of FIG. 5.

Referring to FIGS. 5 to 6, the boom post 20 includes a pair of left and right side plates 20a and 20b, and at least on connection plate 20c for connecting the two side plates 20a and 20b. In a state in which the first coupling point U1 is coupled first, the quick joint 3 according to the present invention, which is coupled to the coupling target shaft 14 of the boom post support 10 or released from the coupling target shaft 14, is provided between the two side plates 20a and 20b.

The quick joint 3 is provided for allowing the front loader 2 to be rapidly and detachably coupled to the tractor 1, and includes a coupling member 30. The coupling member 30 may have a hook shape as illustrated in the drawings, and may be pivotally connected to the first pivot point P1 of the boom post 20, which constitutes the front loader 2, through a first pivot shaft 31.

A spring member 32 is coupled to the coupling member 30. The spring member 32 applies an elastic force in a direction of releasing the coupling member 30 from the coupling target shaft 14 of the boom post support 10. The spring member 32 may be a tension spring, and one end and an opposite end of the spring member 32 may be connected to a first spring connection part 304 provided to the coupling member 30 and a second spring coupling part 204 of the boom post 20, respectively.

In addition, the quick joint 3 includes a lock unit 34 for rotating the coupling member 30 in a direction of coupling the coupling member 30 to the coupling target shaft 14, or releasing the coupling member 30 from the coupling target shaft 14.

The lock unit 34 has a part making contact with the coupling member 30 to rotate about a fixed pin 33 which is provided on a side surface of the boom post 20, and is provided with a lock pin 36 for restraining behavior of the coupling member 30 (up-down tilting behavior of the coupling member 30 about the first pivot shaft 31) at a coupling position A1.

The lock pin 36 is moved along a guide slot 38 formed in the boom post 20. In addition, a part of an outer surface of lock pin 36 makes contact with a part of an upper surface of the coupling member 30 on an inner side of the boom post 20. Accordingly, due to the lock pin 36 moving along the guide slot 38, the coupling member 30 may be rotated in the direction of coupling the coupling member 30 to the coupling target shaft 14, or in the direction of releasing the coupling member 30 from the coupling target shaft 14.

The guide slot 38 has an arc shape along a trajectory of a motion (rotary motion) of the lock pin 36 about the fixed pin 33 to restrictively allow the movement of the lock pin 36. A fixing groove 380 may be formed in the guide slot 38 and aligned on a same line with the coupling position A1 at which the lock pin 36 restrains the movement of the coupling member 30.

The fixing groove 380 may be formed in a radial direction of the motion trajectory toward the fixed pin 33 by a predetermined depth. The predetermined depth, that is, a depth of the fixing groove 380 may be equal to or greater than a diameter of the lock pin 36. This is because up-down movement of the lock pin 36 within the fixing groove 380 may be stably suppressed when the depth of the fixing groove 380 is equal to or greater than the diameter of the lock pin 36.

When the lock unit 34 rotating about the fixed pin 33, specifically, the lock pin 36 reaches the coupling position A1, the lock pin 36 is fixedly inserted into the fixing groove 380 by an elastic force of a lock spring 37. Accordingly, the movement of the coupling member 30 is restrained/restricted. In other words, when the lock unit 34 is operated to the coupling position A1, the coupling member 30 becomes unable to move.

Preferably, in the embodiment of the present invention, the coupling position A1 may be a rotational position of the lock unit 34 when the coupling target shaft 14 is inserted into a predetermined binding position of the coupling member 30 so that a resistance force against separation is generated. In other words, the coupling position A1 may be a rotational positon of the lock unit 34 when the rotation of the boom post about the first coupling point U1 is suppressed by the coupling member 30 coupled to the coupling target shaft 14.

Figure 7:
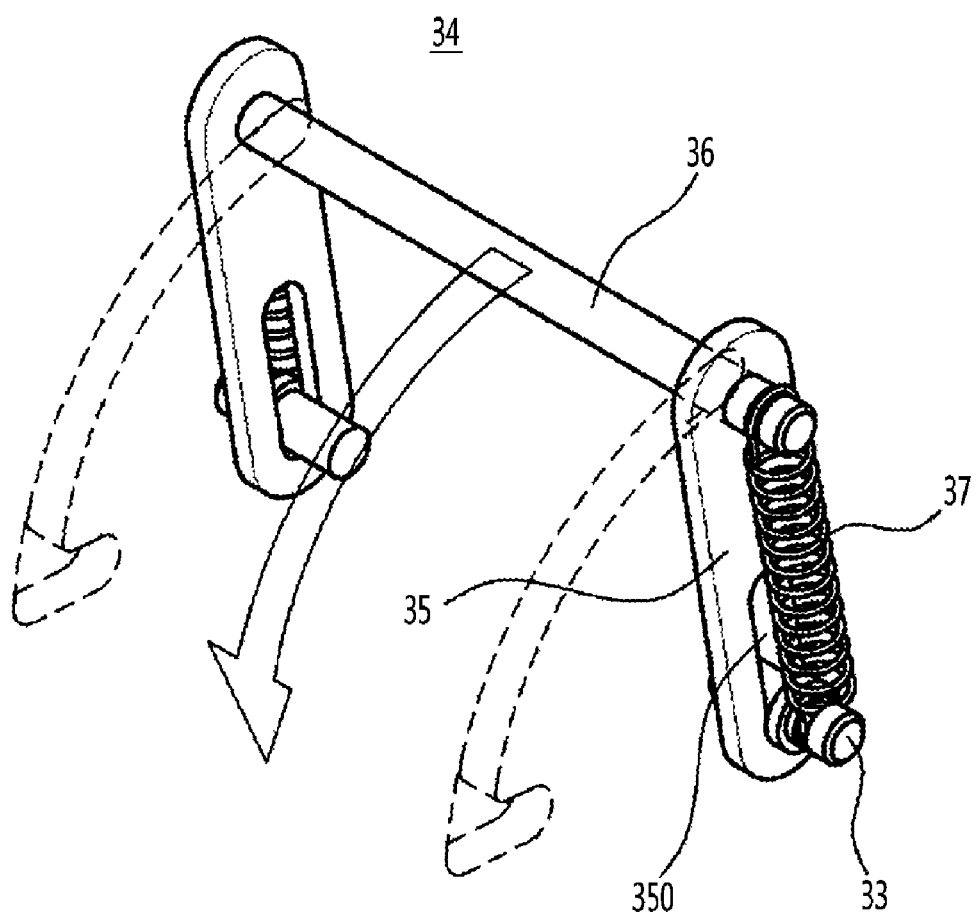
FIG. 7 is a perspective view showing a lock unit.

FIG. 7 is a perspective view showing a lock unit.

Referring to FIG. 7, the lock unit 34 includes a pair of left and right lock levers 35 that are pivoted about the fixed pin 33. In addition, the lock unit 34 is provided with the lock pin 36 having a part of the outer surface which makes contact with a part of the coupling member 30. In this case, the fixed pin 33 may be fixed to the side plates 20a and 20b by a welding or screw-fastening scheme, and the lock pin 36 may be provided such that a part of the lock pin 36 makes contact with a force transfer surface 302 located along a straight line from an upper end of the coupling member 30.

The pair of left and right lock levers 35 disposed in parallel with each other are formed with a slot 350 into which the fixed pin 33 is inserted. The lock levers 35 perform a relative linear motion along the fixed pin 33 within a range defined by the slot 350, and the lock pin 36 may be perpendicularly connected between the lock levers 35 on an opposite side of the lock pin 33.

In addition, the lock pin 36 is mounted so as to be movable along the guide slot 38. Accordingly, as the lock pin 36 moves along a moving path defined by the guide slot 38 according to the rotation of the lock lever 35 about the fixed pin 33, the lock pin 36 restrains the behavior of the coupling member 30 or releases the restraint on the behavior of the coupling member 30 at an above-described specific position (coupling position A1).

The fixed pin 33 and the lock pin 36 may be connected to each other by the lock spring 37. The lock spring 37 may be a tension spring, and applies the elastic force to the lock pin 36 toward the fixed pin 33. Accordingly, the lock lever 35 is retracted in a direction in which a radius of rotation of the lock lever 35 is reduced by the elastic force acting on the lock pin 36 at the coupling position A1, and as a result, the lock pin 36 is inserted into the fixing groove 380.

In other words, the lock pin 36 may be automatically and fixedly inserted into the fixing groove 380 by an elastic restoring force of the lock spring 37 at the coupling position A1, and the coupling member 30 is coupled to the coupling target shaft 14 when the lock pin 36 is located at the coupling position A1, so that rotation behavior of the coupling member 30 is suppressed by the insertion of the lock pin 36 into the fixing groove 380.

As a result, the lock pin 36 is automatically and fixedly inserted into the fixing groove 380 by the elastic restoring force of the lock spring 37 at the coupling position A1. Accordingly, in a state where the coupling member 30 and the coupling target shaft 14 are tightly coupled to each other, the coupling member 30 and the coupling target shaft 14 are maintained in the coupled state by the lock pin 36 fixedly inserted into the fixing groove 380.

Figure 8:
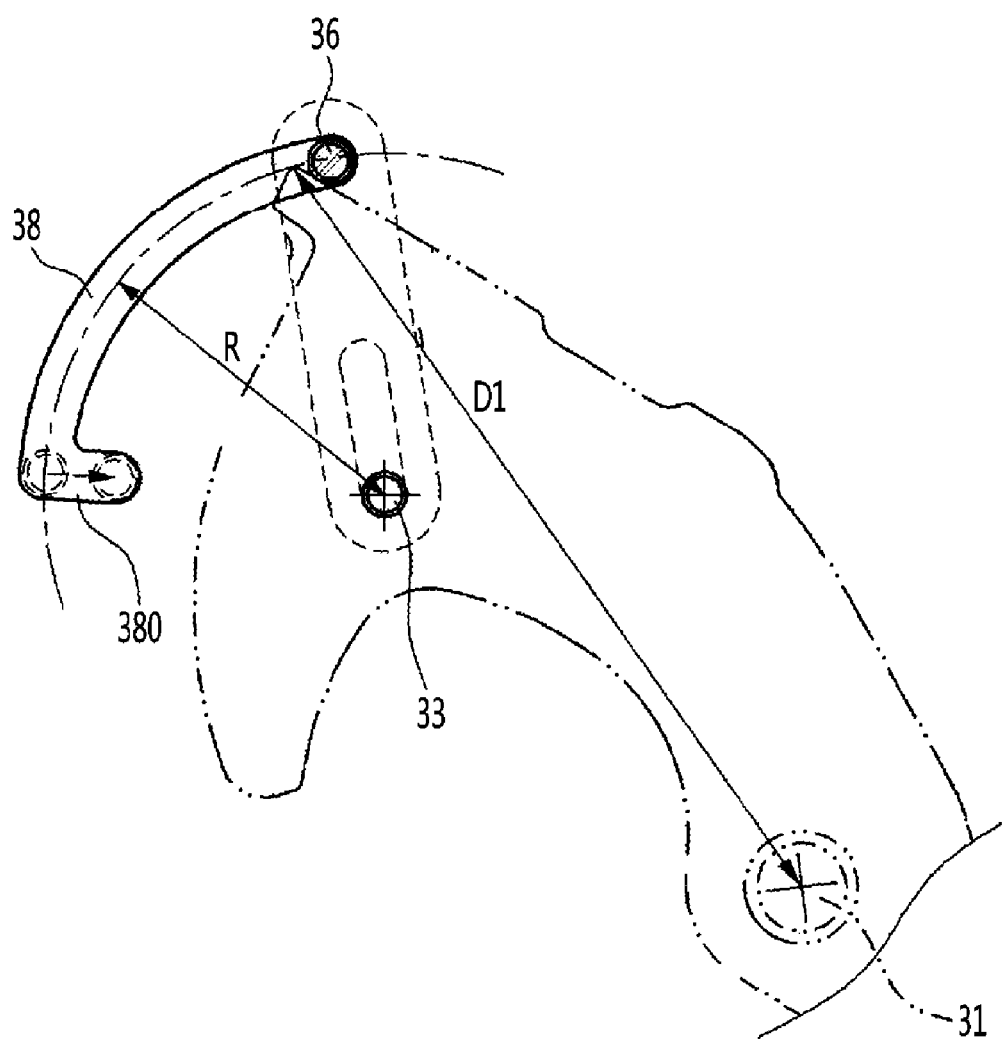
FIG. 8 is a conceptual view showing a guide slot.

FIG. 8 is a conceptual view for explaining a layout of a guide slot.

Referring to FIG. 8, the guide slot 38 may have a width that allows a slight clearance gap with the lock pin 36. Preferably, the guide slot 38 may be curved about the fixed pin 33, and may have an arc shape having a radius curvature R smaller than a distance D1 from the first pivot shaft 31 to an outermost edge of the coupling member 30.

A rotational stroke of the coupling member 30 about the first pivot shaft 31 may be determined by a length of an arc of the guide slot 38. In this case, the length of the arc of the guide slot 38 may be determined to range from a point where the coupling target shaft 14 is positioned at a predetermined binding position of the coupling member 30 so as to generate a coupling force to a point where the coupling member 30 may be completely separated and released from the coupling target shaft 14.

Meanwhile, in FIGS. 4 to 6, reference numerals 102 and 104 respectively denote a seating surface formed on the boom post support 10 toward the boom post 20 and a stopper further protruding toward the boom post 20 than the seating surface, and reference numeral 202 denotes a seating plate provided on the boom post 20 so as to correspond to the seating surface 102.

When coupling the boom post 20 to the boom post support 10, the seating plate 202 starts to make contact with the seating surface 102 immediately after the seating pin 22 of the boom post 20 is coupled to the seating groove 12 of the boom post support 10. When the seating plate 202 completely makes tight contact with the seating plate 102, the boom post 20 is positioned at the rotational position where the coupling target shaft 14 may be coupled to the coupling member 30.

The functions of the seating surface 102, the stopper 104, and the seating plate 202 will be described in more detail below with reference to FIG. 9 that illustrates a process of attaching the front loader to the tractor.

Figure 9:
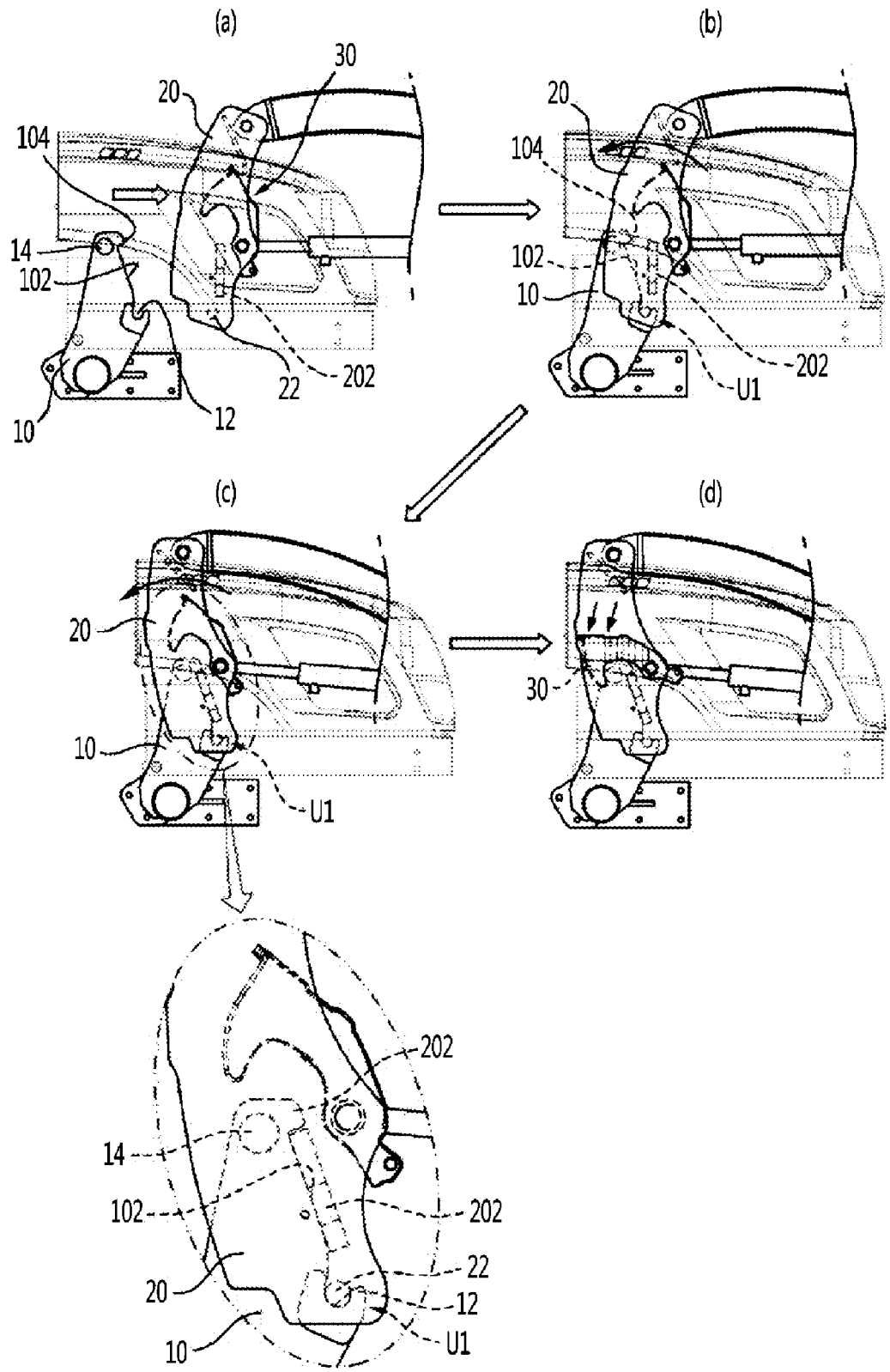
FIG. 9 is a view showing operating states of a quick joint when the front loader is attached to a front side of the tractor.

FIG. 9 is a view showing operating states of a quick joint when the front loader is attached to a front side of the tractor.

As shown in FIG. 9, the connection between the boom post support 10 provided on the tractor 1 and the boom post 20 provided on the front loader 2 to attach the front loader 2 to the front side of tractor 1 may be simply implemented by coupling the first coupling point U1 (see FIG. 3) first, and coupling the quick joint 3 to the coupling target shaft 14 at the second coupling point U2 in a state where the first coupling point U1 is coupled.

More specifically, first, the tractor 1 is moved to face the front loader 2 placed on the ground (see the direction of an arrow of FIG. 9A) and coupled to the front loader 2 such that the seating pin 22 disposed at a lower end portion of the boom post 20 is seated in the seating groove 12 of the boom post support 10 provided on the tractor 1 (see FIG. 9B). In this state, the tractor 1 is slightly moved forward towards the front loader 2.

As the tractor 1 continuously moves forward immediately after the seating pin 22 disposed at the lower end portion of the boom post 20 is coupled to the seating groove 12 of the boom post support 10 (see FIG. 9B), the seating plate 202 of the boom post 20 starts to make contact with the seating surface 102 of the boom post support 10 according to a counterclockwise rotation of the boom post 20 about the seating pin 22 coupled to the seating groove 12.

Thereafter, as shown in FIG. 9C, when the seating plate 202 completely makes tight contact with the seating plate 102, relative rotation (counterclockwise rotation in the drawing) of the boom post 20 about the first coupling point U1 (a portion where the seating pin is coupled to the seating groove) is suppressed. At this time, the boom post 20 is positioned at the rotational position where the coupling member 30 may be coupled to the coupling target shaft 14.

In addition, when the seating plate 202 completely makes tight contact with the seating plate 102, up-down fluctuation of the boom post 20 with respect to the boom post support 10 is suppressed due to the coupling of the seating pin 22 with the seating groove 12 at the first coupling point U1 and due to the stopper 104 provided in the form of surrounding an upper edge of the seating plate 202.

As shown in FIG. 9C, when the boom post 20 is positioned at the rotational position where the coupling member 30 may be coupled to the coupling target shaft 14 in a state in which the boom post 20 may no longer be rotated (when the boom post 20 reaches a position where the coupling member 30 may be coupled to the coupling target shaft 14), the coupling member 30 is coupled to the coupling target shaft 14 through the lock unit 34 as shown in FIG. 9D.

Figure 10:
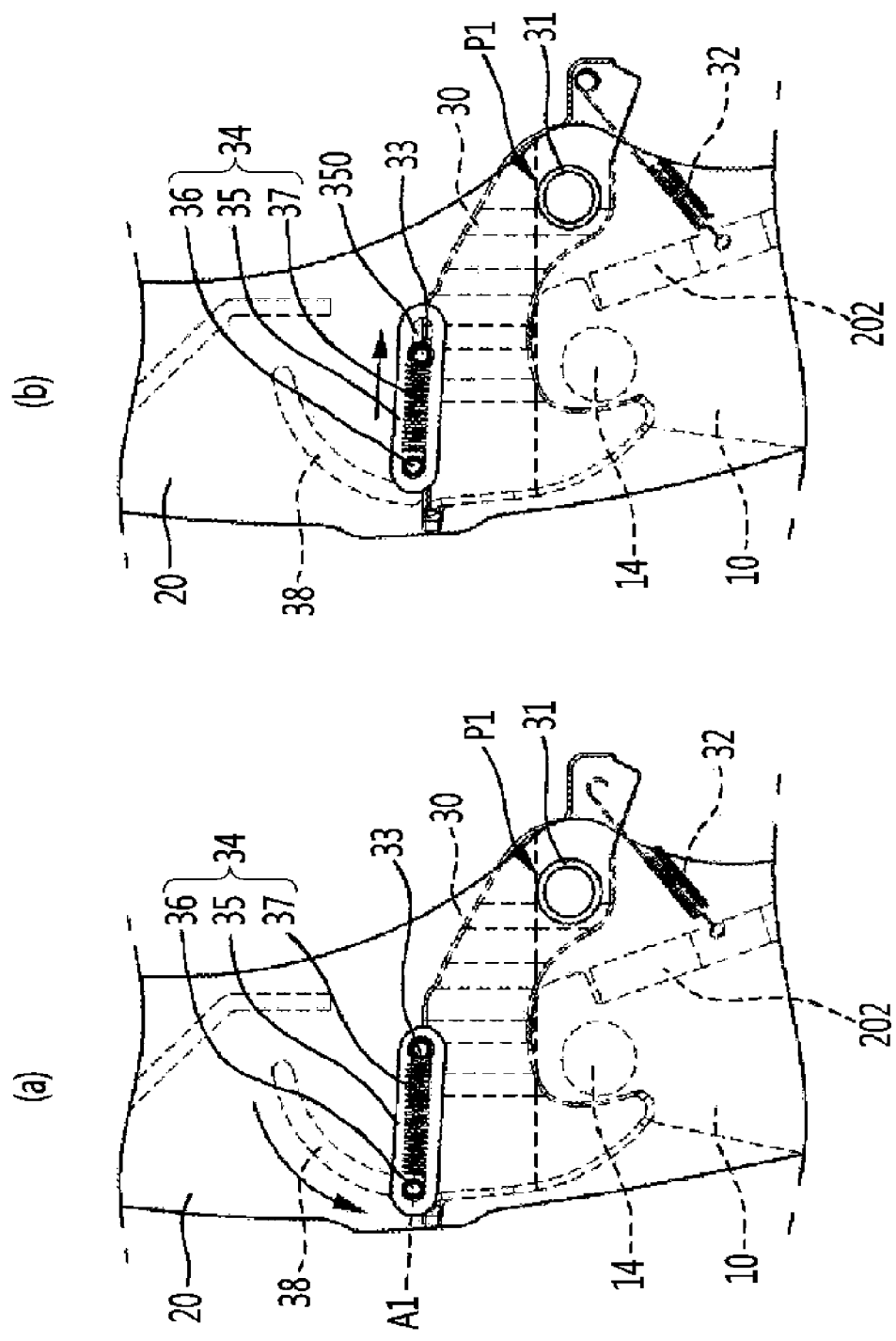
FIG. 10 is an enlarged view showing main parts in the process of coupling the quick joint with respect to a coupling target shaft at a second coupling point.

FIG. 10 is an enlarged view showing main parts in the process of coupling the quick joint with respect to a coupling target shaft at a second coupling point.

Referring to FIG. 10, when a force is applied to the lock unit 34 to move the lock unit 34 to the coupling position A1 as shown in FIG. 10A, the coupling member 30 rotates together with the lock pin 36 about the first pivot point P1 and is coupled to the coupling target shaft 14. In addition, the lock lever 35 is retracted, and the lock pin 36 is inserted into the fixing groove 380 (see FIG. 6) at the coupling position A1 by the elastic force of the lock spring 37 as shown in FIG. 10B.

In other words, the lock pin 36 is automatically and fixedly inserted into the fixing groove 380 by the elastic restoring force of the lock spring 37 at the coupling position A1. At this time, since the coupling member 30 is already coupled to the coupling target shaft 14, behavior (tilting) of the coupling member 30 is restrained by the insertion of the lock pin 36 into the fixing groove 380, so that the coupling member 30 and the coupling target shaft 14 are maintained in the state where the coupling member 30 and the coupling target shaft 14 are tightly coupled to each other.

Meanwhile, the front loader 2 may be removed in a reverse order of the above-described assembly. When the lock pin 36 inserted into the fixing groove 380 is slightly pushed upward while being pulled forward, the coupling member 30 is rotated in the direction of releasing the coupling member 30 from the coupled shaft 14 by the elastic force provided by the spring member 32 to the coupling member 30, so that the coupling between the coupling member 30 and the coupled shaft 14 is released.

In this state, the front loader 2 may be easily removed by gradually moving the tractor 1 rearward.

According to the quick joint of the front loader of the embodiment of the present invention described above, a fastening scheme using the hook-shaped coupling member is adopted, so that the front loader can be easily and rapidly attached to or removed from the tractor without exerting a great amount of effort as compared with the conventional pin connection scheme.

What is claimed is:

1. A quick joint of a front loader, the quick joint comprising:
   a coupling member (30) having a hook shape and pivotally connected to a first pivot point (P1) of a boom post (20) through a first pivot shaft (31);
   a spring member (32) for applying an elastic force in a direction of releasing the coupling member (30) from a coupling target shaft (14) disposed on a boom post support (10) which is attached to a tractor (1);
   a lock unit (34) having a part making contact with the coupling member (30) to rotate about a fixed pin (33) which is provided on a side surface of the boom post (20), and provided with a lock pin (36) for restraining behavior of the coupling member (30) at a coupling position (A1); and
   a guide slot (38) having an arc shape and formed in the boom post (20) to define a moving path of the lock pin (36) when the lock unit (34) rotates,
   wherein a fixing groove (380) is formed in the guide slot (38) and aligned on a same line with the coupling position (A1), and
   the lock pin (36) is inserted into the fixing groove (380) to restrain the behavior of the coupling member (30) when the rotating lock unit (34) reaches the coupling position (A1).

2. The quick joint of claim 1, wherein a part of a lower side of the lock pin (36) makes contact with a force transfer surface (302) located along a straight line from an upper surface of the coupling member (30).

3. The quick joint of claim 1, wherein the lock unit (34) includes:
   a lock lever (35) having a slot (350) into which the fixed pin (33) is inserted;
   the lock pin (36) perpendicularly connected to a front end portion of the lock lever (35) such that a part of an outer surface of the lock pin (36) makes contact with a force transfer surface (302) of the coupling member (30); and
   a lock spring (37) for connecting the fixed pin (33) to the lock pin (36) and applying an elastic force to the lock pin (36) toward the fixed pin (33), and
   as the lock pin (36) moves along the moving path defined by the guide slot (38) according to the rotation of the lock lever (35) about the fixed pin (33), the lock pin (36) restrains the behavior of the coupling member (30) or releases the restraint on the behavior of the coupling member (30).

4. The quick joint of claim 3, wherein the lock pin (36) is automatically inserted into the fixing groove (380) of the guide slot (38) at the coupling position (A1) by the elastic force of the lock spring (37).

5. The quick joint of claim 1, wherein the coupling position (A1) is a rotational position of the lock unit (34) when the coupling target shaft (14) is inserted into a predetermined binding position of the coupling member (30).

* * * * *